United States Patent [19]

Guyon

[11] Patent Number: 5,073,083

[45] Date of Patent: Dec. 17, 1991

[54] TURBINE VANE WITH INTERNAL COOLING CIRCUIT

[75] Inventor: Benoît P. Guyon, Combs La Ville, France

[73] Assignee: Societe Nationale d'Etude de Construction de Moteurs d'Aviation, Paris, France

[21] Appl. No.: 665,244

[22] Filed: Mar. 6, 1991

[30] Foreign Application Priority Data

Mar. 14, 1990 [FR] France ............................. 90 03236

[51] Int. Cl.$^5$ .............................................. F01D 5/00
[52] U.S. Cl. ................................... 415/115; 415/116; 416/96 A; 416/97 R
[58] Field of Search .............. 415/115, 116; 416/96 A, 416/96 R, 97 R

[56] References Cited

U.S. PATENT DOCUMENTS

| | | | |
|---|---|---|---|
| 2,847,185 | 8/1958 | Petrie et al. | 415/115 |
| 3,301,527 | 1/1967 | Kercher | 415/115 |
| 3,574,481 | 4/1971 | Pyne . | |
| 3,628,880 | 12/1971 | Smuland | 415/115 |
| 3,806,275 | 4/1974 | Aspinwall | 415/115 |
| 4,257,737 | 3/1981 | Andress et al. | 416/97 R |
| 4,347,037 | 8/1982 | Corrigan . | |
| 4,946,346 | 8/1990 | Ito | 415/115 |
| 5,002,460 | 3/1991 | Lee et al. | 415/115 |

FOREIGN PATENT DOCUMENTS

| | | | |
|---|---|---|---|
| 1456065 | 8/1969 | Fed. Rep. of Germany | 416/96 |
| 2640827 | 1/1975 | Fed. Rep. of Germany . | |
| 2290569 | 3/1975 | France . | |
| 755919 | 7/1956 | United Kingdom . | |

OTHER PUBLICATIONS

French Search Report (Nov. 30, 1990).

Primary Examiner—Edward K. Look
Assistant Examiner—Michael S. Lee
Attorney, Agent, or Firm—Bacon & Thomas

[57] ABSTRACT

A vane for a turbojet engine, is disclosed having an airfoil-shaped body with a leading edge, a trailing edge, a generally concave sidewall and a generally convex sidewall defining a hollow vane interior. A cooling air supply duct extends substantially over the entire length of the vane and communicates with a turbulence chamber in the vicinity of the leading edge which is separated from the supply duct by a partition having air cooling orifices to allow the air to pass from the cooling air supply duct into the turbulence chamber. The air from the turbulence chamber is evacuated through evacuation orifices defined by the generally convex sidewall in the vicinity of the leading edge. A plurality of heat exchange members are located in the interior of the vane such that they are spaced apart, extend substantially parallel to each other and substantially perpendicular to a longitudinal axis of the vane. The heat exchange members have downstream edges located adjacent to the trailing edge of the vane and upstream edges, which define a portion of the cooling air supply duct. Each of the heat exchange members is in heat exchange contact with the generally concave sidewall and the generally convex sidewall and are spaced apart by spacing ribs interposed beween adjacent heat exchange members.

8 Claims, 1 Drawing Sheet

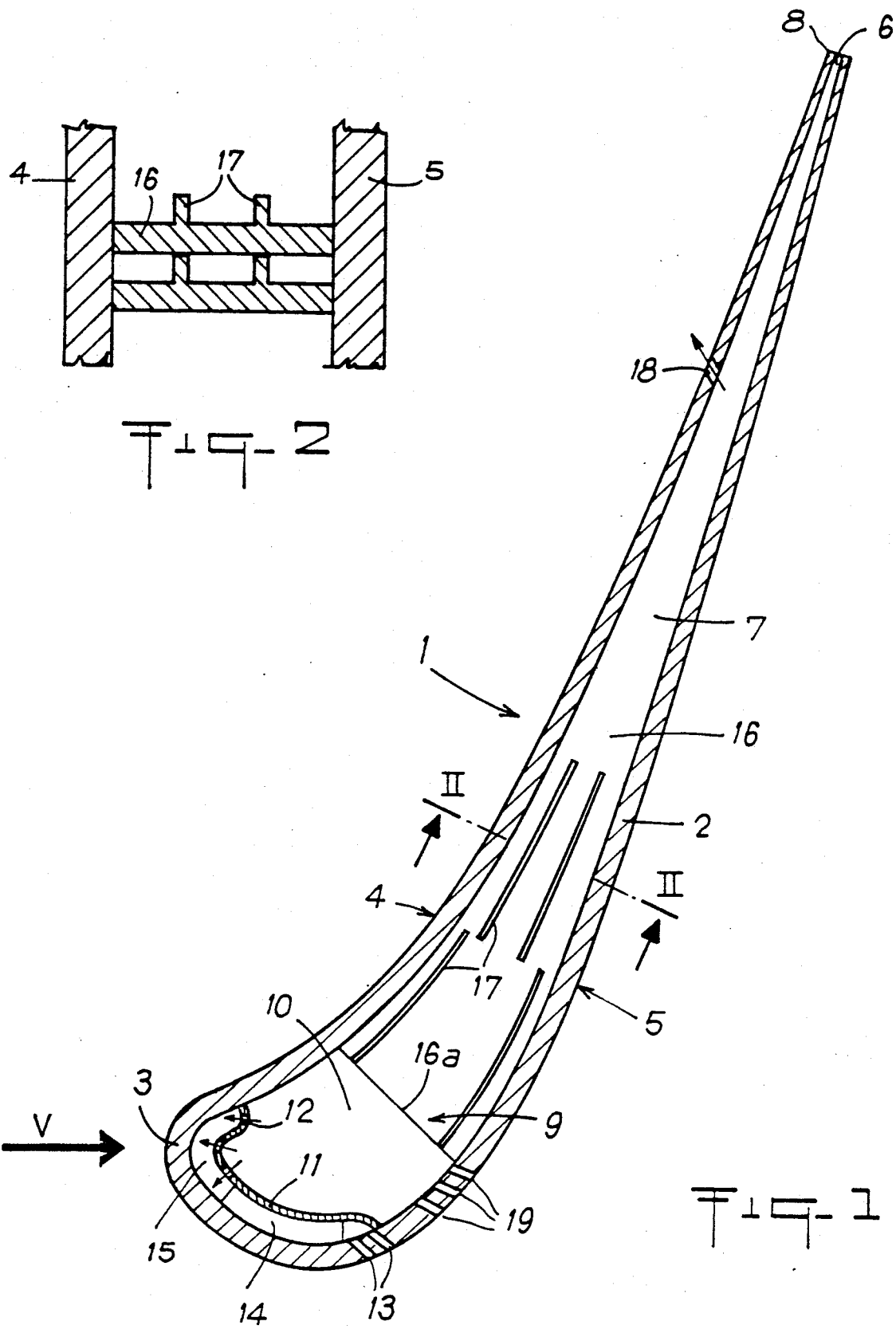

TURBINE VANE WITH INTERNAL COOLING CIRCUIT

BACKGROUND OF THE INVENTION

The present invention relates to a guide vane for a turbo machine, such as an aircraft turbojet engine, in which the internal structure of the vane defines cooling air circuits.

Guide vanes for turbo machines, such as turbojet engines, are well known the art. A typical example is shown in U.S. Pat. No. 3,574,481 in which the interior of the vane accommodates a cooling air supply duct, which is formed separately from the vane. The interior walls of the vane form partitions which define cooling passages along the internal sides of the convex and concave sidewalls. The cooling air passes through the cooling air supply duct and into a turbulence chamber to cool the leading edge of the vane. Thereafter, the cooling air circulates through the circulation passages on both sides of the separate cooling air supply duct and is exhausted through openings formed in the trailing edge of the vane.

French Patent 2,290,569 also describes a guide vane having internal cooling means wherein a separate internal part defines cooling passageways and wherein an additional partition cuts the passageway between the swirl chamber and the circulation passageways on the convex side of the vane. The cooling air enters the turbulence chamber and is evacuated toward the trailing edge of the vane adjacent to the interior of the convex sidewall. A portion of the cooling air passing along the convex sidewall is evacuated through evacuation orifices located at the end of the air circulation passages through the convex sidewall near the leading edge.

These known vanes have cooling means which allow the cooling of the leading edge of the vane by forcing the cooling air against the internal portion of the leading edge. This causes the cooling air to be significantly heated which, in turn, causes the cooling air to poorly cool the sidewalls of the vane. In the aforementioned French patent, the air exiting through the evacuation orifices located at the end of the air circulation passages is also comparatively warm, so that it cannot thermally protect the outside surface of the convex sidewall. In addition, even through the internal structures of the known vanes include heat radiating surfaces which are swept by the cooling air, the heat exchange through such heat radiating surfaces is slight due to the small spacing between the separate cooling air ducts and the vane sidewalls.

Due to these limitations in the cooling of the vanes, the temperature of the gases exiting from the turbojet engine combustion chamber must be limited so as to not structurally weaken the vanes. Generally, the vanes immediately downstream of the turbojet engine combustion chamber are subjected to the highest thermal stresses. Since the turbojet engine performance increases as the exhaust gas temperature increases, the limitations of the exhaust temperature due to the inefficient cooling of the guide vanes imposes a severe limitation on the engine performance. Quite obviously, it would be beneficial to cool the guide vanes as much as possible so that they may withstand a higher exhaust temperature which results in increased performance of the turbojet engine.

SUMMARY OF THE INVENTION

A vane for a turbo machine, such as a turbojet engine, is disclosed having an airfoilshaped body with a leading edge, a trailing edge, a generally concave sidewall and a generally convex sidewall defining a hollow vane interior. A cooling air supply duct extends substantially over the entire length of the vane and communicates with a turbulence chamber in the vicinity of the leading edge which is separated from the supply duct by a partition having air cooling orifices to allow the air to pass from the cooling air supply duct into the turbulence chamber. The air from the turbulence chamber is evacuated through evacuation orifices defined by the generally convex sidewall in the vicinity of the leading edge.

A plurality of heat exchange members are located in the interior of the vane such that they are spaced apart, extend substantially parallel to each other and substantially perpendicular to an longitudinal axis of the vane. The heat exchange members have downstream edges located adjacent to the trailing edge of the vane and upstream edges, which define a portion of the cooling air supply duct. Each of the heat exchange members is in heat exchange contact with the generally concave sidewall and the generally convex sidewall and are spaced apart by spacing ribs interposed between adjacent heat exchange members.

A first portion of the cooling air entering the cooling air supply duct passes through the air cooling orifices in the partition and enters the turbulence chamber. It then passes over a plurality of cooling fins prior to its exiting through the evacuation orifices defined by the generally convex sidewall in the vicinity of the leading edge. A second portion of the cooling air passes through the spaces defined between the heat exchange members and exits through an opening in the trailing edge of the vane. Additional evacuation orifices may be defined by the generally convex sidewall to communicate with the cooling air supply duct so as to provide a layer of cooling air on the external surface of the convex sidewall. Additional evacuation orifices may be provided through the concave sidewall communicating with the spaces between the heat exchange members to provide a film of cooling air on an exterior surface of this sidewall.

The vane incorporating the cooling circuit according to this invention has improved cooling characteristics over the known prior art, which enables its use with a higher temperature combustion gas which, in turn, increases the efficiency of the turbojet engine.

The cooling circuit according to the present invention provides two separate cooling paths each fed with cold air from the cooling air supply duct. The first circuit, which is comparatively smaller in size, cools only the leading edge zone and includes the turbulence chamber the cooling fins and the evacuation orifices. The second circuit includes the air passing between the heat exchange members and exits through the trailing edge. The areas of the heat exchange members in contact with the cooling air has been significantly increased over the known prior art resulting in increased vane cooling.

BRIEF DESCRIPTION OF THE DRAWINGS

FIG. 1 is a transverse, cross-sectional view of the turbine vane according to the present invention.

FIG. 2 is a cross-sectional view taken along line II—II in FIG. 1.

DETAILED DESCRIPTION OF THE PREFERRED EMBODIMENT

The turbine vane 1 according to the present invention, in known fashion, forms a portion of an array of fixed guide vanes extending around an annular space through which the hot gases generated in the combustion chamber of the turbojet engine pass. This stationary array of vanes is mounted upstream of a set of moving blades on a high pressure turbine wheel and deflects the hot gases emanating from the combustion chamber and impinging on the leading edge 3 of the vane 1 in the direction V.

The guide vane 1 consists of a hollow metal body 2 which has an airfoil profile. The body 2 defines a leading edge 3, a generally concave sidewall 4, a generally convex sidewall 5 and a trailing edge 8. The vane may be manufactured either in integral form by precision casting, or may be manufactured in two parts by conventional machining. The thickness of the walls defining the body 2 may be continuous throughout the body cross section, or may gradually diminish in the direction toward the trailing edge 8. The trailing edge 8 defines a slit 6 that allows the hollow interior 7 to communicate with the exterior.

The vane body 2 is affixed, in known fashion, at either end to the turbojet engine casing. A cooling system 9 is located in the interior cavity 7 and is supplied with cooling air from the turbojet engine in known fashion. The cooling air enters the interior cavity 7 through an aperture located on one end of the vane (the other end of the vane being sealed) and is fed into the interior of the vane by a supply duct 10 which communicates with the aperture and extends substantially along the entire length of the vane. Following the utilization of the cooling air, it is evacuated from the interior of the vane through either the slit 6 in the trailing edge or evacuation orifices defined in the sidewalls of the body 2.

The cooling system 9 includes a longitudinally extending partition 11 which extends substantially parallel to the wall of the body 2 between the leading edge portion of the generally concave sidewall 4 and the leading portion of the generally convex sidewall 5. The partition 11 defines a plurality of air cooling orifices 12 located near the leading edge 3 which allow air to pass from the supply duct 10 into a turbulence chamber 15. The leading portion of the generally convex sidewall 5 defines a plurality of first evacuation orifices 13 which allow the cooling air to pass from the turbulence chamber 15 to the exterior of the vane. A plurality of heat exchange fins 14 may be located in the turbulence chamber 15 and extend generally parallel to each other between the partition 11 and the leading edge portion of the generally convex sidewall 5 adjacent to the evacuation orifices 13. The heat exchange fins 14 act as heat radiators and are in heat exchange contact with the leading edge portion of the generally convex wall 5.

As can be readily seen, a first portion of the cooling air from cooling air supply duct 10 passes through the air cooling orifices 12 and enters the turbulence chamber 15 so as to cool the leading edge 3. The air then passes between the heat exchange fins 14 and is evacuated through evacuation orifices 13. The action of the air passing over the heat exchange fins 14 cools the leading edge portion of the generally convex sidewall 5.

A plurality of heat exchange members 16 are located within the interior cavity 7 such that they are spaced apart, extend generally parallel to each other and extend generally perpendicular to a longitudinal axis of the vane. The heat exchange members 16 each have a downstream edge located adjacent to the slit 6 formed in the trailing edge 8, as well as an upstream edge 16a. Each of the heat exchange members 16 are in heat exchange contact with a major portion of the generally convex sidewall 4 and the generally concave sidewall 5. The upstream edges 16a define a downstream boundary of the cooling air supply duct 10. Other boundaries of the cooling air supply duct include the partition 11 as well as leading edge portion of the generally convex sidewall 4 and the generally concave sidewall 5. Thus, the air supply duct 10 need not be formed by a separate structure.

The heat exchange members 16 are spaced apart by means of spacing ribs 17 which are provided on at least one side of the heat exchange members and extend generally parallel to the transverse direction of the vane 1. As can be seen in the figures, each of the heat exchange members 16 may have at least two spacing ribs 17 extending therefrom, with at least one of the spacing ribs 17 extending parallel to the convex sidewall 4 and at least one of the spacing ribs 17 extending generally parallel to the generally concave sidewall 5. As illustrated in FIG. 1, the spacing ribs 17 need not extend the entire length of the heat exchange members 16.

The heat exchange members 16 serve as radiators to transfer the heat they receive from the body 2 to the cooling air which circulates between them. The air, once heated due to the heat transfer from the heat exchange members 16, is exhausted partially through the slit 6 formed in the trailing edge 8. Additional evacuation orifices 18 may be defined through the generally convex sidewall 4 such that they communicate with the spaces between adjacent heat exchange members 16. A portion of the cooling air will exit through these evacuation orifices 18 to form an air protection film on the exterior surface of the generally convex sidewall 4.

Additional evacuation orifices 19 may be defined through the generally convex sidewall 5 such that they communicate with the cold air supply duct 10. The cold air exhausted through these evacuation orifices 19 forms a thin film of cold air on the outside surface of the generally convex sidewall 5 in order to protect a downstream portion of this sidewall.

Thus, a second portion of the cooling air entering the cooling air duct 10 will pass between the spaced apart exchange members 16 in order to extract therefrom and will, as noted above, either exist through the slot 6, or through the evacuation orifices 18.

The heat exchange panels 16 are relatively close to one another and the spaces between them are narrow. The heat exchange surfaces between the vane body 2 and the cooling air circulating in the second portion of the cooling circuit are, thereby, substantially increased in comparison with the heat exchange surfaces of the known vanes. As a result of this increased cooling effect, the vane may be used in higher-temperature combustion gases, thereby increasing the efficiency of the turbojet engine in which the structure is utilized.

The components of the cooling circuit 9, i.e. the partition 11, the heat exchange fins 14 and the heat exchange members 16 may be affixed to the body 2 by any known means, as long as such attachments or connections allow the transfer of heat between the body 2 and these elements.

The foregoing description is provided for illustrative purposes only and should not be construed as in any way limiting his invention, the scope of which is defined solely by the appended claims.

I claim:

1. A vane for a turbomachine having an airfoil shaped body with a leading edge, a trailing edge, a generally concave sidewall, and a generally convex sidewall defining a hollow interior comprising:
   a) a partition extending between the generally concave sidewall and the generally convex sidewall adjacent to, but spaced from the leading edge so as to define a turbulence chamber the partition defining air cooling orifices;
   b) first evacuation orifices defined by the generally convex sidewall and communicating with the turbulence chamber; and,
   c) a plurality of spaced apart heat exchange members extending substantially parallel to each other between the generally concave sidewall and the generally convex sidewall, the heat exchange members having a downstream edges located adjacent to the trailing edge and upstream edges, the upstream edges, along with the partition and portions of the generally concave sidewall and the generally convex sidewall defining a cooling air supply duct whereby a first portion of cooling air in the cooling air supply duct passes through the air cooling orifices, through the turbulence chamber and exits through the first evacuation orifices and a second portion of cooling air in the cooling air supply duct passes between the heat exchange members and exits through a slot at the trailing edge.

2. The vane of claim 1 wherein the heat exchange members are located substantially along the entire length of the vane and extend generally perpendicular to a longitudinal axis of the vane.

3. The vane of claim 1 further comprising a plurality of heat exchange fins located in the turbulence chamber and extending between the partition and a portion of the generally convex sidewall adjacent to the leading edge.

4. The vane of claim 1 further comprising second evacuation orifices defined by the generally convex sidewall and communicating with the cooling air supply duct.

5. The vane of claim 4 further comprising third evacuation orifices defined by the generally concave sidewall and communicating with the vane interior between the heat exchange members.

6. The vane of claim 1 further comprising spacing ribs extending from at least one side of the heat exchange members to space the heat exchange members apart.

7. The vane of claim 6 wherein each heat exchange member has at least two spacing ribs extending therefrom.

8. The vane of claim 7 wherein at least one of the spacing ribs extends generally parallel to the generally concave sidewall and at least one of the spacing ribs extends generally parallel to the generally convex sidewall.

* * * * *